(12) United States Patent
Hoerger et al.

(10) Patent No.: US 10,333,310 B2
(45) Date of Patent: Jun. 25, 2019

(54) POWER FACTOR CORRECTION DEVICE AND METHOD FOR OPERATING A POWER FACTOR CORRECTION DEVICE

(71) Applicant: SIEMENS AKTIENGESELLSCHAFT, Munich (DE)

(72) Inventors: Wolfgang Hoerger, Hausen (DE); Martin Pieschel, Nuremberg (DE); Jonas Pinkwart, Fuerth (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/768,568

(22) PCT Filed: Sep. 19, 2016

(86) PCT No.: PCT/EP2016/072150
§ 371 (c)(1),
(2) Date: Apr. 16, 2018

(87) PCT Pub. No.: WO2017/063819
PCT Pub. Date: Apr. 20, 2017

(65) Prior Publication Data
US 2018/0309293 A1 Oct. 25, 2018

(30) Foreign Application Priority Data

Oct. 16, 2015 (DE) .................. 10 2015 220 220

(51) Int. Cl.
*H02J 3/18* (2006.01)
*H02M 1/42* (2007.01)
(Continued)

(52) U.S. Cl.
CPC ......... *H02J 3/1842* (2013.01); *H02M 1/4208* (2013.01); *H02M 7/5387* (2013.01);
(Continued)

(58) Field of Classification Search
CPC .......... H02J 3/1842; H02J 3/18; H02J 3/1821; H02M 1/4208; H02M 7/5387;
(Continued)

(56) References Cited

U.S. PATENT DOCUMENTS

| 8,207,712 B2* | 6/2012 | Hasler | H02J 3/1842 |
| | | | 323/208 |
| 2010/0308559 A1* | 12/2010 | Tarasinski | A01B 59/00 |
| | | | 280/422 |

(Continued)

FOREIGN PATENT DOCUMENTS

EP 2416486 A1 2/2012

*Primary Examiner* — Adolf D Berhane
(74) *Attorney, Agent, or Firm* — Laurence Greenberg; Werner Stemer; Ralph Locher

(57) ABSTRACT

A power factor correction device for an AC voltage supply system includes a transformer which is interconnected, on the secondary side, to form a star point circuit and which has a secondary-side connection for each phase. A module series circuit with at least two switching modules, which are connected in series and each of which has at least four switches and a capacitor, is respectively connected between each of the secondary-side connections of the transformer and the star point of the star circuit. There is provided a transformer which is a high-leakage-reactance transformer.

17 Claims, 5 Drawing Sheets

(51) Int. Cl.
*H02M 7/5387* (2007.01)
*H02M 1/00* (2006.01)
*H02M 3/155* (2006.01)

(52) U.S. Cl.
CPC .............. *H02M 2001/007* (2013.01); *H02M 2003/1552* (2013.01); *Y02E 40/22* (2013.01)

(58) Field of Classification Search
CPC .... H02M 2001/007; H02M 2003/1552; Y02E 40/22; G05F 1/70
See application file for complete search history.

(56) References Cited

U.S. PATENT DOCUMENTS

2012/0026967 A1    2/2012  Pajukoski et al.
2016/0308368 A1*  10/2016  Letas ..................... H02J 3/12

\* cited by examiner

POWER FACTOR CORRECTION DEVICE AND METHOD FOR OPERATING A POWER FACTOR CORRECTION DEVICE

BACKGROUND OF THE INVENTION

Field of the Invention

The invention relates to a power factor correction device for an AC grid system and to a method for operation thereof.

A power factor correction device is known by way of example from U.S. Pat. No. 8,207,712 B2. The prior art power factor correction device is equipped with a transformer, the secondary side of which is connected up in a star point circuit and which has one secondary-side connection per phase. Each of the secondary-side connections of the transformer and the star point of the star circuit have a respective module series circuit connected between them having at least two series-connected switching modules that each have at least four switches and a capacitor. The transformer is a step-down transformer. Alternatively, the star point generation has been described by means of a transformer of what is known as "zig zag" type.

The invention is based on the object of specifying an improved power factor correction device.

SUMMARY OF THE INVENTION

This object is achieved according to the invention by a power factor correction device having the features as claimed. Advantageous configurations of the power factor correction device according to the invention are specified in sub claims.

Accordingly, the invention provides for the transformer of the power factor correction device to be a high-leakage-reactance transformer.

A substantial advantage of the power factor correction device according to the invention can be seen in that the secondary side of the high-leakage-reactance transformer does not have to have any further inductances present in order to allow satisfactory operation of the module series circuits provided on the secondary side. This is attributable to the fact that high-leakage-reactance transformers, owing to their design, always have a very high inductance on the secondary side on account of the leakage fields that occur on the secondary side. In other words, the concept of the invention is thus that of allowing leakage-field inductances, which high-leakage-reactance transformers have owing to their design, for secondary-side operation of module series circuits, in particular of multilevel converter modules that are formed by these module series circuits.

A further substantial advantage of the power factor correction device according to the invention can be seen in that they are realizable in particularly compact fashion on account of the omission of additional inductances on the secondary side of the transformer. In power factor correction devices customary today, air-cored coils are used on the secondary side that, on account of their size and the magnetic fields they generate, have to be installed in the open air, that is to say outside the building in which the other components of the power factor correction device are arranged. Since the use, provided for according to the invention, of a high-leakage-reactance transformer means that no further inductances, in particular no air-cored coils, are required on the secondary side, it is possible for all components of the power factor correction device to be accommodated in a self-contained room or a self-contained building; it is not necessary for individual components of the power factor correction device to be arranged in the open air.

With a view to the configuration of the high-leakage-reactance transformer, it is regarded as particularly advantageous if the dispersion of the leakage fields is proportioned such that the short-circuit voltage of the high-leakage-reactance transformer referenced to the rated voltage is at least 20% when the secondary winding is shorted.

In regard to the electrical connection of the secondary-side leakage inductances, it is regarded as advantageous if the secondary-side leakage inductances acting on the secondary-side connections, which leakage inductances are influenced by the leakage fields of the high-leakage-reactance transformer, are each in series with the module series circuit connected to the respective secondary-side connection of the high-leakage-reactance transformer.

As already mentioned, with a view to a compact design for the power factor correction device or with a view to all components of the power factor correction device being able to be accommodated in a self-contained building, that is to say not in the open air, it is advantageous if the module series circuits are each inductor-free, but at least air-cored-inductor-free.

In the case of a three-phase AC grid system, it is regarded as advantageous if the high-leakage-reactance transformer has, on the secondary side, a star winding forming the star point and, on the primary side, a delta winding, which form the primary-side transformer connections of the high-leakage-reactance transformer.

In order to allow the power factor correction device to be switched on with minimum negative reaction to the AC grid system, it is regarded as advantageous if the power factor correction device has a switching device that is connected between the outer system connections of the power factor correction device and the primary-side transformer connections of the high-leakage-reactance transformer.

Preferably, the switching device has a nonreactive resistor and a switch connected in parallel therewith.

It is particularly advantageous if the switching device has a series circuit that comprises a first switch and a parallel circuit, connected in series with the first switch, comprising a nonreactive resistor and a second switch connected in parallel with the resistor.

With a view to the actuation of this switching device, it is regarded as advantageous if the power factor correction device has a control device that is configured such that it leaves the first and second switches in their respective open switch position when the power factor correction device is switched off, first of all closes the first switch and leaves the second switch open in a first sequence step when the power factor correction device is started up, and additionally closes the second switch in a subsequent second sequence step when the power factor correction device is started up.

Alternatively or additionally, there may advantageously also be switching devices connected between the secondary-side transformer connections of the high-leakage-reactance transformer and the module series circuits connected to said transformer connections: such switching devices can each comprise a first switch and a parallel circuit, connected in series with the first switch, comprising a nonreactive resistor and a second switch connected in parallel with the resistor; the two switches of such switching devices are preferably actuated just as has already been explained above in connection with a switching device connected on the primary side.

Alternatively, it is also possible for just switching devices that are formed by a nonreactive resistor and a switch connected in parallel therewith to be used on the secondary side.

In order to allow equalizing currents on the secondary side of the power factor correction device without reaction to the primary side or without reaction to the AC grid system, or with only minimal reaction, it is regarded as advantageous if the module series circuits each have, in addition to the switching modules, a series resonant circuit, connected in series with the switching modules, the resonant frequency of which is three times the system frequency or an integer multiple of these three times.

In regard to the series resonant circuit, it is regarded as advantageous if it or at least one of the series resonant circuits comprise(s) an inductance, in particular an inductance having an iron core, and a capacitor connected in series therewith or is/are formed by these components.

In other words, it is thus advantageous if the module series circuits each have, in addition to the switching modules, an impedance connected in series with the switching modules, in particular an inductance having an iron core, and/or a capacitor.

Furthermore, it is regarded as advantageous if—additionally or alternatively—the secondary-side star point of the high-leakage-reactance transformer and the electrical connecting point for the module series circuits have an impedance, in particular an inductance having an iron core, and/or a capacitor connected between them.

As a particular preference, the secondary-side star point of the high-leakage-reactance transformer and the electrical connecting point for the module series circuits have a series circuit comprising an inductance and a capacitor connected between them. The inductance and the capacitor form a series resonant circuit. The resonant frequency of the series resonant circuit is preferably three times the system frequency or an integer multiple of these three times.

With a view to a particularly compact design for the power factor correction device or with a view to preferably no components needing to be arranged in the open air or in the surroundings, it is regarded as advantageous if the high-leakage-reactance transformer and the module series circuits, in particular all electrical components of the power factor correction device, are physically accommodated in a room sealed from the outside, in particular in the same building or in the same enclosure.

The switching modules are preferably H-bridge modules that each have four semiconductor switches, each of which has a diode connected in parallel with it, and a capacitor.

The invention furthermore relates to a method for operating a power factor correction device for an AC grid system, wherein a transformer, the secondary side of which is connected up in a star point circuit and which has one secondary-side connection per phase, is used to generate secondary-side phase voltages, and the secondary-side phase voltages are each applied to a module series circuit having at least two series-connected switching modules that each have at least four switches and a capacitor.

In regard to such a method, the invention proposes that the transformer used is a high-leakage-reactance transformer, and the current through the module series circuits is smoothed over time by the secondary-side leakage inductances of the high-leakage-reactance transformer and is limited in the event of a secondary-side short circuit.

In regard to the advantages of the method according to the invention, reference should be made to the explanations above in connection with the power factor correction device according to the invention.

BRIEF DESCRIPTION OF THE SEVERAL VIEWS OF THE DRAWINGS

The invention is explained in more detail below on the basis of exemplary embodiments, for which, by way of example.

Throughout the figures, the same reference symbols are used for identical or comparable components for the sake of clarity.

DESCRIPTION OF THE INVENTION

Figure 1:
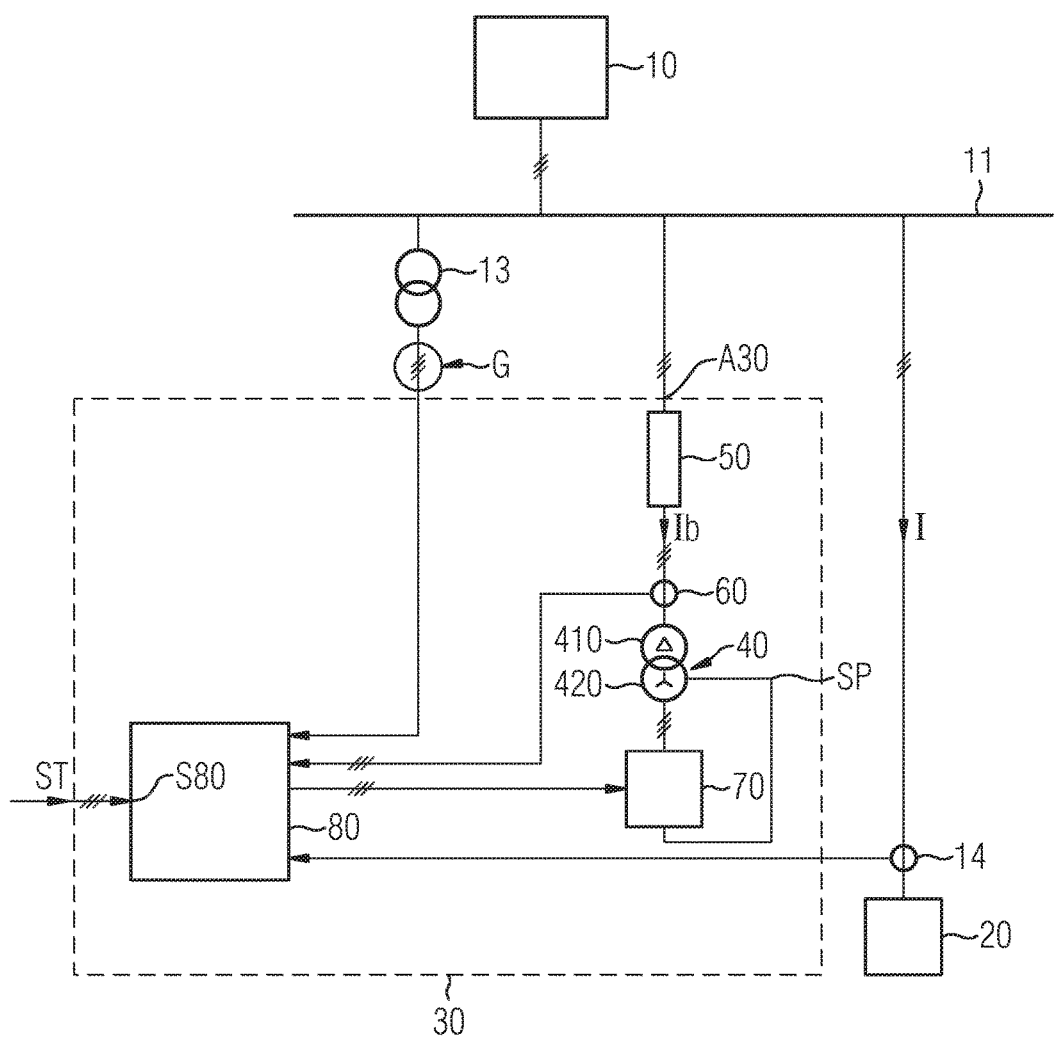
FIG. 1 shows an exemplary embodiment of a power factor correction device according to the invention that can be used for compensating for reactive power in a three-phase AC grid system.

FIG. 1 shows a three-phase AC grid system 10 to which an electrical load 20 is connected via a connecting bar 11. To compensate for reactive power that the electrical load 20 draws from or supplies to the AC grid system 10, a power factor correction device 30 is provided that is likewise connected to the connecting bar 11 and is in electrical parallel with the load 20.

In the exemplary embodiment shown in FIG. 1, the power factor correction device 30 has a high-leakage-reactance transformer 40, the primary side of which comprises a delta winding 410 and the secondary side of which comprises a star winding 420.

The delta winding 410 forms three primary-side transformer connections of the high-leakage-reactance transformer 40 that are connected to the outer system connections A30 of the power factor correction device 30 via a switching device 50. Since the AC grid system 10 is a three-phase AC grid system in the exemplary embodiment shown in FIG. 1, the power factor correction device 30 is equipped with three outer system connections A30, only one of which is depicted in FIG. 1 as representative of all three system connections for the sake of clarity. The three-phase nature of the connecting lines between the components of the installation shown in FIG. 1, and hence the three-phase nature of the components themselves, is symbolized by a group G of three parallel strokes in each case in FIG. 1.

In the exemplary embodiment shown in FIG. 1, the switching device 50 and the primary-side transformer connections of the high-leakage-reactance transformer 40 have a current sensor 60 provided between them that senses the individual phase currents of the three-phase current Ib flowing through the power factor correction device 30.

The star winding 420 of the high-leakage-reactance transformer 40 forms secondary-side transformer connections and also a star point SP that have a multilevel converter module 70 connected between them.

To actuate the switching device 50 and to actuate the multilevel converter module 70, the power factor correction device 30 has a control device 80. The control device 80 is connected to the current sensor 60 and evaluates the current Ib flowing through the power factor correction device 30. Furthermore, the control device 80 is connected to a voltage sensor 13 that measures the system voltage on the connecting rail 11, or the system voltage of the AC grid system 10, and to a current sensor 14 that measures the load current I flowing through the electrical load 20.

The control device 80 can, by way of example, comprise a computation device, in particular a microprocessor device, that is programmed such that it performs control of the power factor correction device 30, in particular control of the multilevel converter module 70, on the basis of the measured values applied on the input side, specifically preferably such that the power factor correction device 30 compensates for the reactive power brought about by the load 20.

The control device 80 preferably moreover has a control input S80 to which an external control signal ST for external control of the power factor correction device 30, or the multilevel converter module 70 thereof, can be supplied.

It is also advantageous if the control device 80 is furthermore connected to current sensors that are present inside the multilevel converter module 70 and that comprises module currents flowing inside the multilevel converter module 70. Exemplary embodiments of corresponding multilevel converter modules 70 are described later on.

Figure 2:
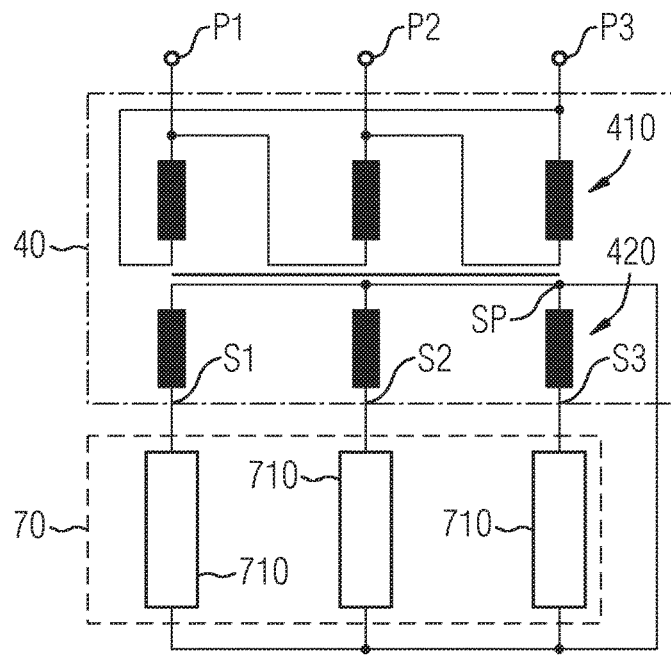
FIG. 2 shows exemplary embodiments of a high-leakage-reactance transformer and a multilevel converter module for the power factor correction device shown in FIG. 1, in more detail.

FIG. 2 shows an exemplary embodiment of a high-leakage-reactance transformer 40 and a multilevel converter module 70 that can be called upon or used to form the power factor correction device 30 shown in FIG. 1.

The high-leakage-reactance transformer 40 shown in FIG. 2 has a primary-side delta winding 410 that forms three primary-side transformer connections P1, P2 and P3 of the high-leakage-reactance transformer 40. The three primary-side transformer connections P1, P2 and P3 can be connected to the current sensor 60 or to the switching device 50 shown in FIG. 1.

The high-leakage-reactance transformer 40 furthermore comprises a secondary-side star winding 420 that is formed by a star point circuit comprising secondary-side single windings of the high-leakage-reactance transformer 40. The secondary-side star winding 420 forms three secondary-side transformer connections S1, S2 and S3 of the high-leakage-reactance transformer 40 and also a star point SP.

In FIG. 2, it is furthermore possible to see three module series circuits 710 that form the multilevel converter module 70. The module series circuits 710 are each connected between one of the secondary-side transformer connections S1, S2 or S3 and the star point SP that the star winding 420 forms.

Figure 3:
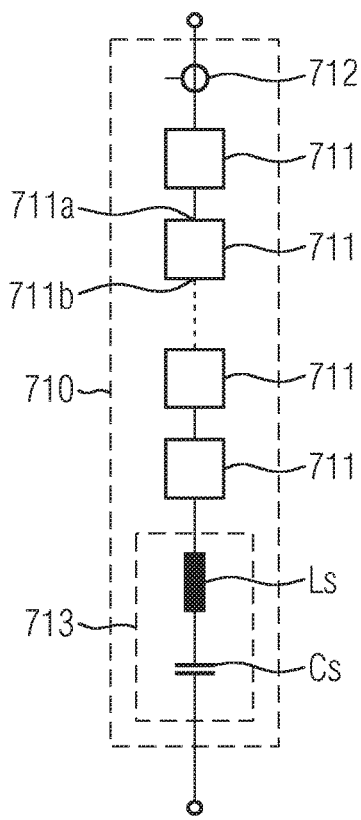
FIG. 3 shows an exemplary embodiment of a module series circuit that can be used for the power factor correction device shown in FIG. 1 or for the multilevel converter module shown in FIG. 2.

FIG. 3 shows an exemplary embodiment of a module series circuit 710 that is suitable for forming the multilevel converter module 70 shown in FIG. 2 or the multilevel converter module 70 shown in FIG. 1.

The module series circuit 710 shown in FIG. 3 comprises a multiplicity of switching modules 711, a series-circuit-specific current sensor 712 and a series resonant circuit 713.

The current sensor 712 measures the current flowing through the module series circuit 710 and delivers a corresponding current measured value preferably to the control device 80 shown in FIG. 1.

The series resonant circuit 713 is formed by an inductance Ls and by a capacitor Cs. The inductance Ls preferably comprises an iron core, particularly preferably a coil, the coil interior of which is completely or partly filled with an iron core.

The series resonant circuit 713, or the components Ls and Cs thereof, is preferably proportioned such that the series resonant circuit 713 has a resonant frequency that corresponds to three times the system frequency of the AC grid system 10 shown in FIG. 1 or to an integer multiple of this system frequency. A resonant frequency of this kind allows equalizing currents that flow inside the multilevel converter module 70 or at least on the secondary side of the power factor correction device 30 but—owing to the choice of frequency—will not reach the AC grid system 10, or at least not to a significant extent.

Figure 4:
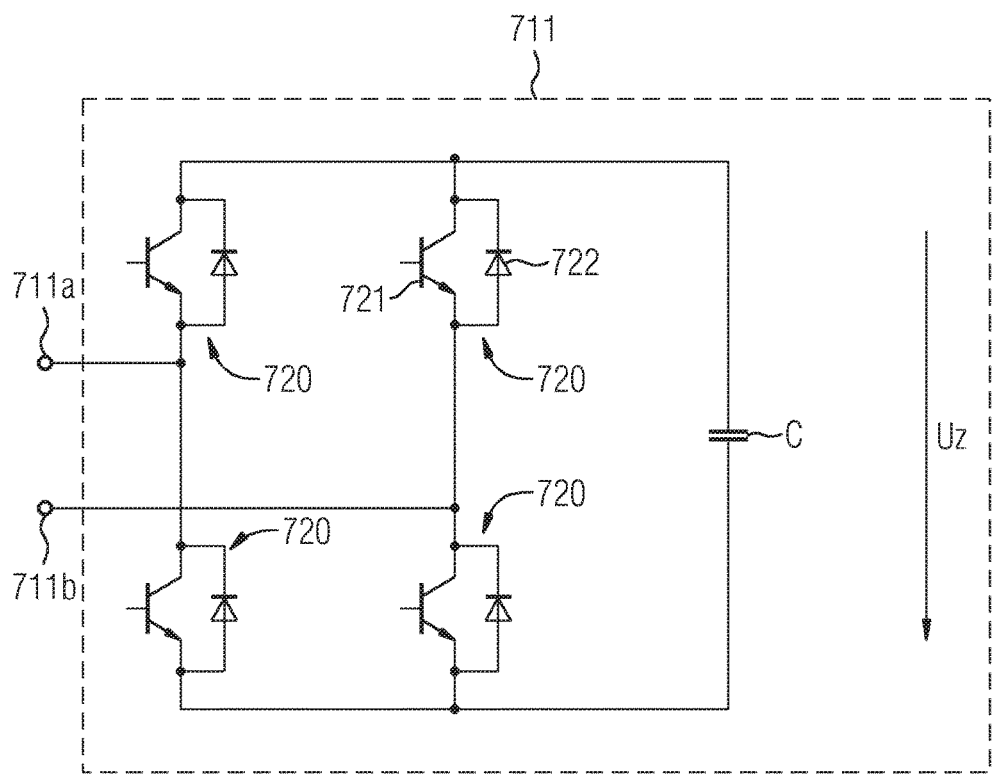
FIG. 4 shows an exemplary embodiment of a switching module that can be used to form the module series circuit shown in FIG. 3.

FIG. 4 shows an exemplary embodiment of a switching module 711 that is suitable for forming the module series circuit 710 shown in FIG. 3 or for forming the module series circuit 710 shown in FIG. 2. The switching module 711 is an H-bridge module that comprises four switches 720 connected up to form an H-bridge circuit. The switches 720 are preferably each formed by a semiconductor switching element 721, for example in the form of a transistor (such as an IGTB, for example), and a semiconductor diode 722 connected in parallel therewith. Connected in parallel with the series circuit comprising two respective switches 720 is a capacitor C of the switching module 711 across which an intermediate circuit voltage UZ of the switching module 711 is dropped.

The outer connections of the switching module 711 are each denoted by the reference symbols 711a and 711b in FIGS. 3 and 4 in order to clarify the interconnection of the switching modules 711 with one another.

Figure 5:
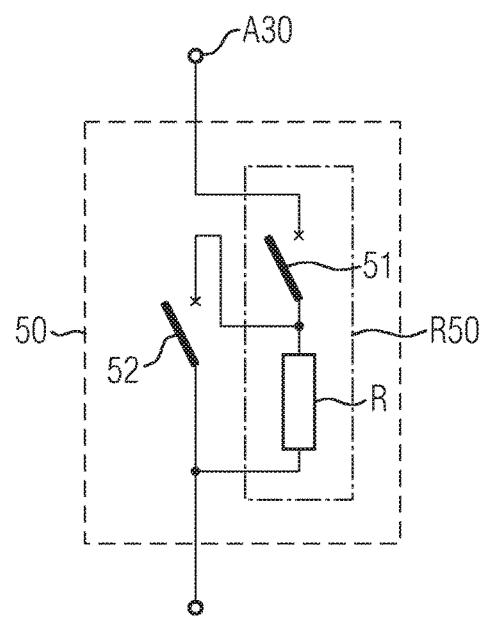
FIG. 5 shows an exemplary embodiment of a switching device that can be used for the power factor correction device shown in FIG. 1.

FIG. 5 shows an exemplary embodiment of a switching device 50 that can be used for the power factor correction circuit 30 shown in FIG. 1. The switching device 50 comprises a series circuit R50 that is formed by a first switch 51 and a parallel circuit, connected in series therewith, comprising a nonreactive resistor R and a second switch 52.

The top connection of the switching device 50 in FIG. 5 is preferably connected to the outer system connection A30 of the power factor correction device 30 shown in FIG. 1.

The bottom connection of the switching device 50 in FIG. 5 is preferably connected to the current sensor 60 shown in FIG. 1 or the primary-side transformer connections of the high-leakage-reactance transformer 40.

The switching device 50 shown in FIG. 5 is—as already mentioned in connection with FIG. 1—preferably of three-phase design. For reasons of clarity, FIG. 5 shows only one of the three phase winding sections of the switching device 50. The other two phase winding sections, not shown in FIG. 5, of the switching device 50 may be identical to the phase winding section shown in FIG. 1.

The switching device 50 is actuated by the control device 80 shown in FIG. 1 preferably such that it puts the first and second switches 51 and 52 into their respective open switch position, or leaves them there, for the switched-off state of the power factor correction device 30.

The power factor correction device 30 is preferably started up in two chronological sequence steps: in a first sequence step when the power factor correction device 30 is started up, the control device 80 first of all closes the first switch 51 and leaves the second switch 52 open; in a subsequent second sequence step when the power factor correction device is started up, it additionally closes the second switch 52, as a result of which the resistor R is shorted and rendered inactive.

Figure 6:
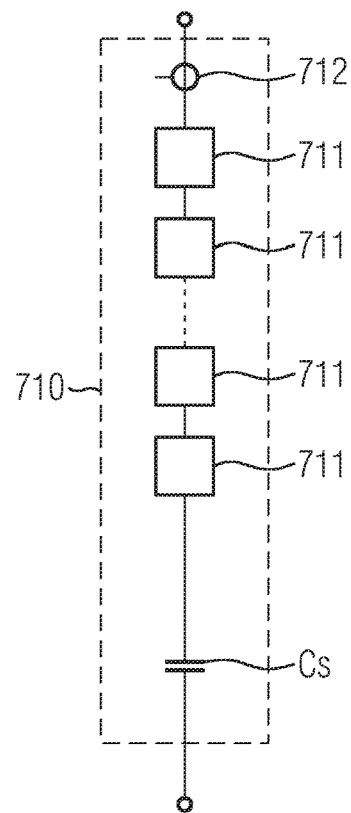
FIG. 6 shows a further exemplary embodiment of a module series circuit that can be used for the power factor correction device shown in FIG. 1 or the multilevel converter module shown in FIG. 2.

FIG. 6 shows a further exemplary embodiment of a module series circuit 710 that is suitable for forming the multilevel converter module 70 shown in FIG. 2 or for forming the power factor correction device 30 shown in FIG. 1. The module series circuit 710 shown in FIG. 6 has a multiplicity of series-connected switching modules 711, a series-circuit-specific current sensor 712 in series therewith and a capacitor Cs.

The function of the capacitor Cs is to form with the secondary-side inductance of the secondary-side star winding 420 of the high-leakage-reactance transformer 40 (cf. FIGS. 1 and 2) a series resonant circuit whose resonant frequency corresponds to three times the system frequency of the AC grid system 10 shown in FIG. 1 or to an integer multiple of this system frequency. A resonant frequency of this kind advantageously allows equalizing currents inside the multilevel converter module 70 or at least on the secondary side of the power factor correction device 30 that cannot reach the AC grid system 10, or at least not to a significant extent.

Figure 7:
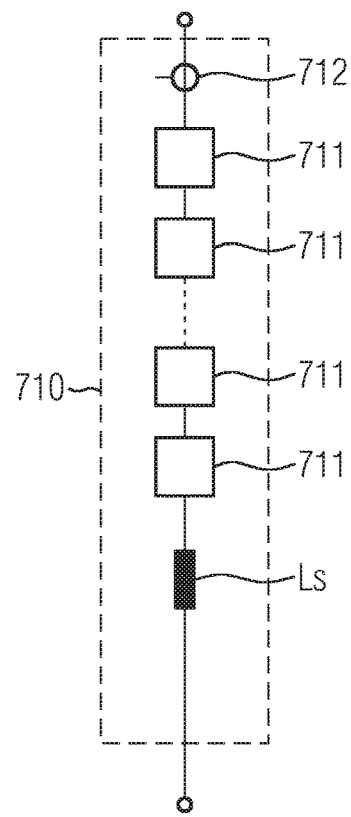
FIG. 7 shows a third exemplary embodiment of a module series circuit that can be used for the power factor correction device shown in FIG. 1 or the multilevel converter module shown in FIG. 2.

FIG. 7 shows a further exemplary embodiment of a module series circuit 710 that is suitable for forming the multilevel converter module 70 shown in FIG. 2 or for forming the power factor correction device 30 shown in FIG. 1. The module series circuit 710 shown in FIG. 7 has a multiplicity of series-connected switching modules 711, a series-circuit-specific current sensor 712 in series therewith and an inductance Ls. The inductance Ls is preferably formed by an inductance having an iron core, particularly preferably by a coil having an iron core.

The absolute value of the inductance Ls is chosen such that it forms, together with the capacitors in the switching modules 711 of the module series circuit 710, a resonant circuit whose resonant frequency corresponds to an integer multiple of the system frequency of the AC grid system 10 shown in FIG. 1 or to an integer multiple of this system frequency. As already explained, a resonant frequency of this kind allows equalizing currents solely inside the multilevel converter module 70 or at least solely on the secondary side of the power factor correction device 30.

Figure 8:
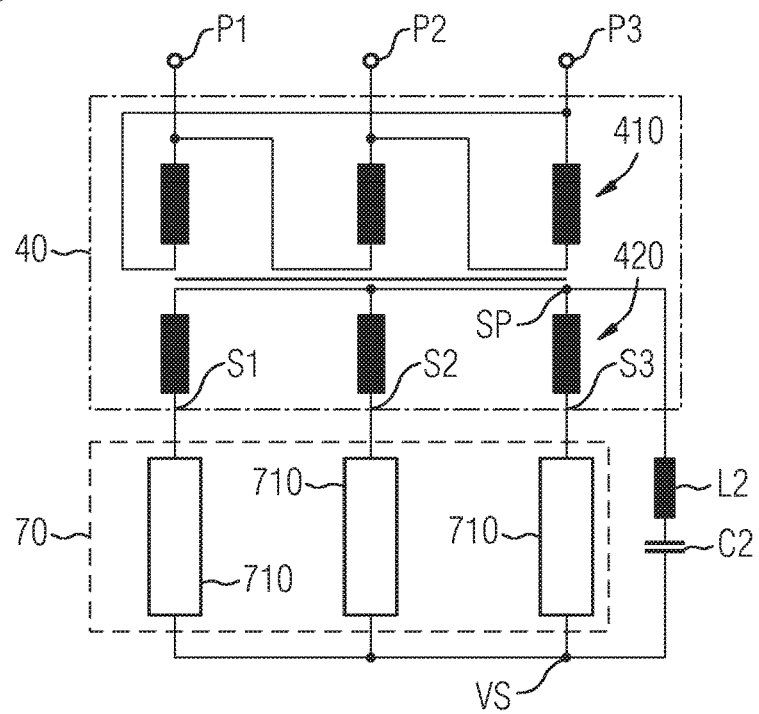
FIG. 8 shows an exemplary embodiment of an arrangement having a high-leakage-reactance transformer, a multilevel converter module and a series resonant circuit between the multilevel converter module and the star point for the power factor correction device shown in FIG. 1.

FIG. 8 shows a further exemplary embodiment of a high-leakage-reactance transformer 40 and a multilevel converter module 70 that can be called upon or used to form the power factor correction device 30 shown in FIG. 1. The arrangement comprising high-leakage-reactance transformer 40 and multilevel converter module 70 shown in FIG. 8 is consistent with the arrangement comprising high-leakage-reactance transformer 40 and multilevel converter module 70 shown in FIG. 2, the only difference being that the secondary-side star point SP of the high-leakage-reactance transformer 40 and the electrical connecting point VS between the module series circuits 710 have an inductance L2 and a capacitor C2 connected between them.

The inductance L2 and the capacitor C2 form a series resonant circuit. The resonant frequency of the series resonant circuit is preferably three times the system frequency of the AC grid system 10 shown in FIG. 1 or is an integer multiple of these three times.

Figure 9:
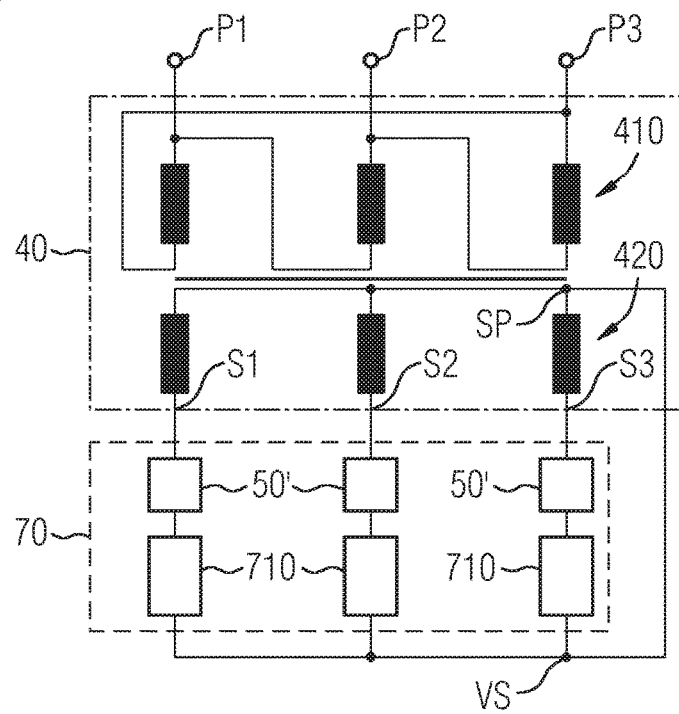
FIG. 9 shows an exemplary embodiment of an arrangement having a high-leakage-reactance transformer and a multilevel converter module for the power factor correction device shown in FIG. 1, wherein switching modules of the multilevel converter module and the respective associated secondary-side transformer connections of the high-leakage-reactance transformer have a respective switching device connected between them.

FIG. 9 shows a further exemplary embodiment of a high-leakage-reactance transformer 40 and a multilevel converter module 70 that can be called upon or used to form the power factor correction device 30 shown in FIG. 1. The arrangement comprising high-leakage-reactance transformer 40 and multilevel converter module 70 shown in FIG. 9 is consistent with the arrangement comprising high-leakage-reactance transformer 40 and multilevel converter module 70 shown in FIG. 2, the only difference being that the secondary-side transformer connections S1, S2 and S3 and the respective associated module series circuit 710 have a respective switching device 50' connected between them.

The switching devices 50' may be identical to the switching device 50 shown in FIG. 5 or may merely be formed by a nonreactive resistor (like the resistor R in FIG. 5) and a switch connected in parallel therewith (like the switch 52 in FIG. 5).

Although the invention has been illustrated and described in more detail by means of preferred exemplary embodiments, the invention is not limited by the disclosed examples, and other variations can be derived therefrom by a person skilled in the art without departing from the scope of protection of the invention.

LIST OF REFERENCE SYMBOLS

10 AC grid system
11 Connecting bar
13 Voltage sensor
14 Current sensor
21 Load
30 Power factor correction device
40 High-leakage-reactance transformer
50 Switching device
50' Switching device
51 Switch
52 Switch
60 Current sensor
70 Multilevel converter module
80 Control device
410 Delta winding
420 Star winding
710 Module series circuits
711 Switching modules
711a Connection
711b Connection
712 Current sensor
713 Series resonant circuit
720 Switch
721 Semiconductor switching element
722 Semiconductor diode A30 System connections
C Capacitor
C2 Capacitor
Cs Capacitor
G Group
L2 Inductance
Ls Inductance
Ib Current through power factor correction device
I Load current
P1 Primary-side transformer connection
P2 Primary-side transformer connection
P3 Primary-side transformer connection
R Nonreactive resistor
R50 Series circuit
S1 Secondary-side transformer connection
S2 Secondary-side transformer connection
S3 Secondary-side transformer connection
SP Star point
ST Control signal
S80 Control input
Uz Intermediate circuit voltage
VS Connecting point

The invention claimed is:

1. A power factor correction device for an AC grid system, comprising:
a high-leakage-reactance transformer having a secondary side connected up in a star point circuit with a star point, said high-leakage-reactance transformer being configured to have a short-circuit voltage relative to a rated voltage that is at least 20% when a secondary winding is shorted;
said transformer having one secondary-side connection per phase;
a respective module series circuit connected between each of said secondary-side connections of said transformer and said star point of said star circuit, said module series circuit including at least two series-connected switching modules each having at least four switches and a capacitor.

2. The power factor correction device according to claim 1, wherein each said module series circuit is inductor-free.

3. The power factor correction device according to claim 1, wherein each said module series circuit is air-cored-inductor-free.

4. The power factor correction device according to claim 1, wherein said high-leakage-reactance transformer has a secondary side with a star winding forming said star point and a primary side with a delta winding forming primary-side transformer connections of said high-leakage-reactance transformer.

5. The power factor correction device according to claim 4, further comprising a switching device connected between each outer system connection of the power factor correction device and said primary-side transformer connections of said high-leakage-reactance transformer or between each of said secondary-side transformer connections and an associated said module series circuit, wherein said switching device has a series circuit with a first switch and a parallel circuit with a nonreactive resistor and a second switch connected in parallel therewith.

6. The power factor correction device according to claim 5, further comprising a control device configured:
to leave said first and second switches in an open switch position when the power factor correction device is switched off;
to first close said first switch and leave said second switch open in a first sequence step when the power factor correction device is started up, and then to close said second switch in a subsequent second sequence step when the power factor correction device is started up.

7. The power factor correction device according to claim 1, wherein each said module series circuit has, in addition to said switching modules, an impedance connected in series with said switching modules and/or a capacitor.

8. The power factor correction device according to claim 1, wherein said high-leakage-reactance transformer and said module series circuits are physically accommodated in a room sealed from an exterior.

9. The power factor correction device according to claim 8, wherein all electrical components of the power factor correction device are physically accommodated in a single building or a single enclosure that is sealed towards the exterior.

10. The power factor correction device according to claim 1, wherein each said module series circuits includes a series resonant circuit connected in series with said switching modules, said series resonant circuit having a resonant frequency three times a system frequency or an integer multiple of three times the system frequency.

11. The power factor correction device according to claim 10, wherein at least one of said series resonant circuits comprises an inductance and a capacitor connected in series therewith or said at least one series circuit consists of said inductance and said capacitor.

12. The power factor correction device according to claim 11, wherein said inductance is an inductance having an iron core.

13. The power factor correction device according to claim 1, wherein said switching modules are H-bridge modules each with four semiconductor switching elements having a respective diode connected in parallel therewith, and a capacitor.

14. The power factor correction device according to claim 1, which comprises an impedance and/or a capacitor connected between said secondary-side star point of said high-leakage-reactance transformer and an electrical connecting point for said module series circuits.

15. The power factor correction device according to claim 14, wherein said impedance is an inductance having an iron core.

16. A power factor correction device for an AC grid system, comprising:
a high-leakage-reactance transformer having a secondary side connected up in a star point circuit with a star point;
said transformer having one secondary-side connection per phase;
a respective module series circuit connected between each of said secondary-side connections of said transformer and said star point of said star circuit, said module series circuit including at least two series-connected switching modules each having at least four switches and a capacitor; and
secondary-side leakage inductances acting on said secondary-side connections and being influenced by leakage fields of said high-leakage-reactance transformer, and wherein each of said secondary-side leakage inductances is in series with said module series circuit connected to the respective said secondary-side connection of said transformer.

17. A power factor correction device for an AC grid system, comprising:

a high-leakage-reactance transformer having a secondary side connected up in a star point circuit with a star point;
said transformer having one secondary-side connection per phase;
a respective module series circuit connected between each of said secondary-side connections of said transformer and said star point of said star circuit, said module series circuit including at least two series-connected switching modules each having at least four switches and a capacitor; and
each said module series circuit having, in addition to said switching modules, an impedance being an inductance having an iron core connected in series with said switching modules and/or a capacitor.

* * * * *